June 23, 1925.
H. FORD ET AL
IGNITION DISTRIBUTOR
Filed Sept. 27, 1924
1,543,377
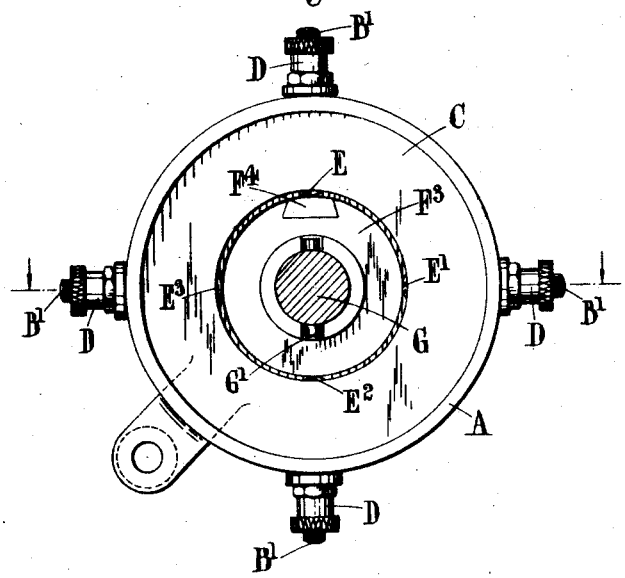
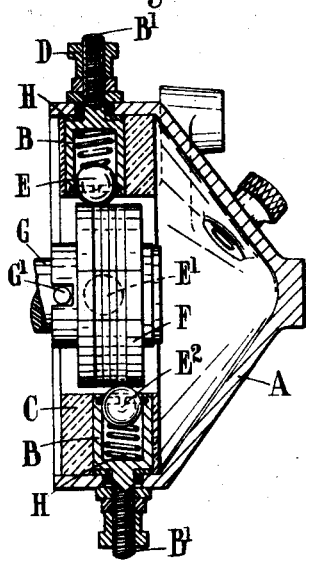
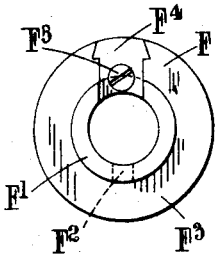
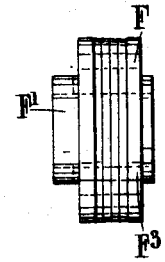
INVENTORS
Harry Ford
George H. Taylor
BY
ATTORNEY Patented June 23, 1925.

1,543,377

UNITED STATES PATENT OFFICE.

HARRY FORD AND GEORGE HENRY TAYLOR, OF STAFFORDSHIRE, ENGLAND.

IGNITION DISTRIBUTOR.

Application filed September 27, 1924. Serial No. 740,161.

*To all whom it may concern:*

Be it known that we, HARRY FORD, a subject of the King of Great Britain, and a resident of Staffordshire, England, and GEORGE HENRY TAYLOR, a subject of the King of Great Britain, and a resident of Staffordshire, England, have invented new and useful Improvements in Ignition Distributors, of which the following is the specification.

This invention relates to improvements in distributors for ignition in internal combustion engines.

It is known to make use of a spring pressed metal ball for contact or make and break purposes in such ignition distributors, in which the contact making steel ball is arranged radially, and adapted to move radially in a tube or pocket, each ball being moved outwardly by a cam boss or projecting striker mounted on the central shaft. It has also been proposed to place the contacting balls in different parallel planes in order to make different tracks or wearing surfaces upon the cam or striker.

According to the present invention we arranged the spring pressed balls in radially placed pockets or tubes, but we dispense with the cam or striker and provide a concentric conducting sleeve upon the shaft and secure thereon a cylindrical ring of suitable hardened insulating material, and we form on the cylindrical or peripheral face of the ring of hard insulating material a dove-tailed slot in which we fit a piece of case-hardened or completely hardened steel, the surface of which is flush with the outer surface of the hard insulating ring.

The sleeve of brass or other good conducting metal forming the hub of the ring has keyway or cotter slots or recesses provided to secure same to the shaft. The conducting piece of hardened steel is provided with a lug projecting inwardly to contact with the brass sleeve, and a screw to secure the steel contact maker to the brass sleeve. The steel balls are arranged in their radial tubes or pockets in different planes, and if constructed for four cylinders, the four balls are arranged at 90 degrees.

Thus without the use of a striker the balls make, if four are used, four different tracks upon the cylindrical surface of the hardened insulating ring and on the contact making dovetailed steel inset. The balls are always pressed by their spring into contact with the insulating ring with the conducting inset hardened steel contact maker.

By this arrangement as compared with all distributors or commutators for ignition purposes in internal combustion engines hitherto used, the life of the distributor is very greatly prolonged, the efficiency of the apparatus is much increased, the wear and noise essential to the use of the striker or cam being dispensed with, and the balls being only slightly spring pressed inwardly and radially upon a cylinder in different tracks, permitting the balls to roll on four tracks, not only is there increased efficiency, but wear is almost eliminated.

And in order that our invention may be completely understood reference should be made to the accompanying sheet of drawings, in which, Fig. 1 is an elevation of the complete apparatus.

Fig. 2 is a sectional view of the outer casing showing two of the balls and the cylindrical four-track distributor in elevation.

Fig. 3 is an end view of the contact making cylinder with the steel inset, and

Fig. 4 is a further view of the cylinder separate from the casing, showing the four tracks made by the four balls arranged in their separate planes.

A is the outer casing of the apparatus. B B are the hollow cylinders or tubes in which the balls are adapted to move radially, two of which are shown in Fig. 2. C is the ring of insulating material in which the cylinders B are radially arranged. Each cylinder is formed integrally with the screw B' which screw is passed through a hole in the casing and projects radially on the outside of same. Each screw is provided with a milled nut D adapted to clamp the end of the current conveying lead or wire. The balls E, E', E², E³, are shown as to a portion of them in contact with the cylindrical contact maker in Fig. 1, and the balls are each pressed by springs H, two of which are shown in Fig. 2, against the surface of the cylinder or contact maker F, which has a central sleeve F' provided with slots F² to engage a pin G' mounted on the shaft G, which shaft is concentrically arranged within the apparatus.

The main body of the contact making cylinder is formed of the insulating block F³ in which is fitted in a dove-tailed recess the contact making steel piece F⁴ which is secured to the inner metallic conducting sleeve F' by the screw F⁵.

It will be observed that contact is made as the shaft rotates by each ball coming in succession into contact with the steel dovetailed block F⁴ and owing to the balls being arranged in separate planes they must each form four separate tracks upon the outer surface of the contact making cylinder, see Fig. 4. By this means not only is absolute silence attained in operation, but practically illimitable wear. A wire ring H is arranged in a groove at the mouth of each cylinder B to prevent the balls from falling out in disassembling the apparatus.

What we do claim as our invention and desire to secure by Letters Patent is:—

A distributor for electric ignition, comprising a rotatable cylinder of insulating material, an electrical conducting means for securing the cylinder to a shaft, a metallic contact strip imbedded transversely in the outer face of the cylinder, an electrical conducting means connecting the strip with the securing means for the cylinder, a plurality of sleeves arranged radially and in separate planes and having open ends terminating adjacent the rotatable cylinder, a spring pressed contact ball in each sleeve adapted to successively engage the metallic strip and to follow a separate track on the rotatable cylinder, and a ring adjacent the open end of each sleeve for preventing the balls from being discharged from the sleeves by the springs when the rotatable cylinder has been removed.

HARRY FORD.
GEORGE HENRY TAYLOR.